(12) United States Patent
Abe et al.

(10) Patent No.: US 8,871,168 B2
(45) Date of Patent: Oct. 28, 2014

(54) PROCESS FOR PRODUCING MONOSILANE FROM DICHLOROSILANE

(75) Inventors: Isao Abe, Kobe (JP); Jérôme Beauvisage, Lans-en-Vercors (FR); Shinji Tomita, Hyogo (JP)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 50 days.

(21) Appl. No.: 13/820,450

(22) PCT Filed: Aug. 29, 2011

(86) PCT No.: PCT/EP2011/064798
§ 371 (c)(1), (2), (4) Date: Jun. 3, 2013

(87) PCT Pub. No.: WO2012/028571
PCT Pub. Date: Mar. 8, 2012

(65) Prior Publication Data
US 2013/0272948 A1    Oct. 17, 2013

(30) Foreign Application Priority Data
Sep. 3, 2010 (EP) .................................... 10305946

(51) Int. Cl.
*C01B 33/04* (2006.01)
*B01J 31/02* (2006.01)

(52) U.S. Cl.
CPC ............ *C01B 33/043* (2013.01); *B01J 31/0239* (2013.01); *B01J 31/0237* (2013.01)
USPC .......................................... 423/347; 423/344

(58) Field of Classification Search
USPC ................................................ 423/347, 344
See application file for complete search history.

(56) References Cited

U.S. PATENT DOCUMENTS

| 4,610,858 A | 9/1986 | Yamada et al. |
| 2004/0091412 A1 | 5/2004 | Muller et al. |

FOREIGN PATENT DOCUMENTS

| EP | 0 213 215 | 3/1987 |
| EP | 2 085 358 | 8/2009 |
| JP | 60 215513 | 10/1985 |
| JP | 61 053108 | 3/1986 |
| JP | 61 151017 | 7/1986 |
| JP | 61 191513 | 8/1986 |
| JP | 1 317114 | 12/1989 |
| JP | 6 333422 | 12/1994 |

OTHER PUBLICATIONS

International Search Report and Written Opinion for PCT/EP2011/064798, Sep. 19, 2011.

*Primary Examiner* — Edward Johnson
(74) *Attorney, Agent, or Firm* — Allen E. White

(57) ABSTRACT

A process for continuously producing monosilane by means of an apparatus comprising a reaction column, at least two upper condensers each with a reflux feed pipe, a bottom reboiler and an evaporation tank connected to a bottom portion of the reaction column; the process comprising: a) supplying dichlorosilane or a mixture of chlorosilanes to an upper stage of the reaction column via an upper feed injection point b) supplying a catalyst to said upper stage of the reaction column via a lower injection point c) introducing the resultant mixture from the top portion of the reaction column to the plurality of upper condensers d) separating monosilane from condensates in the upper condensers e) recycling the condensates through the reflux feed pipes to the upper stage of the reaction column f) bringing the condensates into contact with the catalyst in the reaction column.

7 Claims, 1 Drawing Sheet

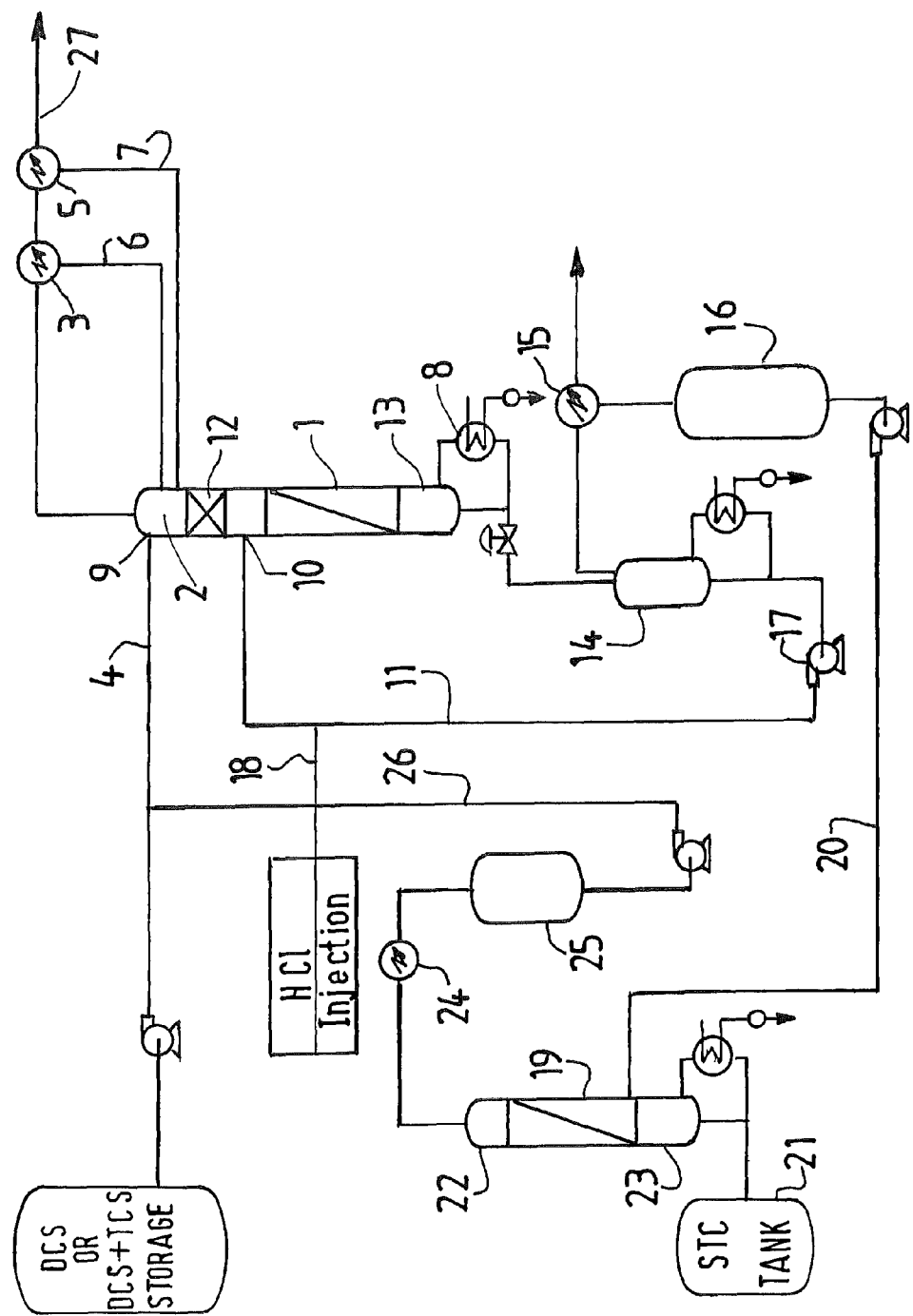

PROCESS FOR PRODUCING MONOSILANE FROM DICHLOROSILANE

CROSS REFERENCE TO RELATED APPLICATIONS

This application is a 371 of International Application PCT/EP2011/064798 filed Aug. 29, 2011, which claims priority to European Application No. 10305946.5 filed Sep. 3, 2010, the entire contents of which are incorporated herein by reference.

BACKGROUND

The present invention relates to a process for continuously producing monosilane, the demand for which is recently increasing as a raw material for epitaxy of silicon with a high purity and for amorphous silicon for solar cells.

A known process for producing monosilane is a process for producing monosilane gas by disproportionating a hydrogenated silicon chloride such as trichlorosilane in the presence of a tertiary amine hydrochloride as a catalyst (JP-B-64-3804 and JP-B-63-33422).

Furthermore, another known process is a process for producing monosilane gas by packing a solid catalyst in a reaction column and disproportionating dichlorosilane therein (JP2,648,615). However, since the conversion reaction to monosilane is an equilibrium reaction, the equilibrated conversion ratio has not necessarily been high heretofore, from 10% to 18%, and a large-size apparatus has been required to achieve a desired production amount.

Another known process is a process for continuously producing monosilane readily and efficiently with a large production amount of monosilane from trichlorosilane and dichlorosilane as raw materials (production amount per hour in use of an apparatus with the same reaction performance). EP 2085358 discloses a process for continuously producing monosilane by means of a monosilane production apparatus comprising a reaction column; the process comprising supplying at least one of trichlorosilane and dichlorosilane to a middle stage of the reaction column. A problem of this invention is the large consumption of energy in producing monosilane from chlorosilanes. For continuously producing monosilane, trichlorosilane (TCS) is commonly used as a feed material. In said process, in order to manufacture one mole of monosilane, four moles of TCS feed is necessary. Besides, three moles of silicon tetrachloride (STC) is manufactured as a by-product. To keep plant operation, seamless feed material supply and by-product collection are required; therefore logistics control for feed and by-products materials has been a serious burden for silane plant administrator.

It is necessary to implement a process with a reduction of consumption of energy compared to the process described above.

The present invention aims at solving the problem by removing the inconvenience of the process described above and to improve the reduction of consumption of energy.

The present invention resides in the following aspects.
A process for continuously producing monosilane by means of a monosilane production apparatus comprising a reaction column, at least two upper condensers each of which has a reflux feed pipe serially connected to a top portion of the reaction column, a bottom reboiler of the reaction column, and an evaporation tank connected to a bottom portion of the reaction column; the process comprising:

a) supplying dichlorosilane or a mixture of tetrachlorosilane, trichlorosilane, dichlorosilane, and monochlorosilane where the ratio of the number of total hydrogen atoms to the number of total chlorine atoms H/Cl is in the range from 0.6 to 3 to an upper stage of the reaction column via an upper feed injection point. Preferably, only dichlorosilane is supplied;

b) supplying a catalyst to said upper stage of the reaction column via a lower injection point;

c) introducing a resultant mixture containing monosilane, monochlorosilane, dichlorosilane, and trichlorosilane from the top portion of the reaction column to the plurality of upper condensers;

d) separating monosilane from condensates containing monochlorosilane, dichlorosilane, and trichlorosilane in the upper condensers;

e) recycling the condensates after separating monosilane, through the reflux feed pipes to the upper stage of the reaction column;

f) bringing the condensates into contact with the catalyst in the reaction column; characterized in that a monosilane rich gas, including monosilane as the primal component by molar basis, preferably comprising more than 60% of monosilane, and more preferably comprising more than 80% of monosilane is produced via a pipe connected downstream the upper condensers.

The upper stage of the column means a region higher than 70% of the column in height.

According to one embodiment, said catalyst is at least one of a tertiary aliphatic hydrocarbon-substituted amine and a tertiary aliphatic hydrocarbon-substituted amine hydrochloride.

According to another embodiment, the tertiary aliphatic hydrocarbon-substituted amine and the tertiary aliphatic hydrocarbon-substituted amine hydrochloride are represented by the following formulae (A) and (B), respectively: $R_1R_2R_3N$ (A); $R_1R_2R_3NH^+Cl^-$ (B), where each of $R_1$, $R_2$ and $R_3$ is an aliphatic hydrocarbon group, the carbon number of each of $R_1$, $R_2$ and $R_3$ is at least 2, and $R_1$, $R_2$ and $R_3$ are the same or different.

According to one embodiment, the process comprises the step:

g) withdrawing a bottom recovery liquid containing tetrachlorosilane, trichlorosilane and the catalyst from the bottom portion of the reaction column, introducing the bottom recovery liquid into the evaporation tank, and recycling the catalyst recovered from the bottom portion of the evaporation tank, to the reaction column.

According to one embodiment, the number of the upper condensers is from 2 to 5.

According to another embodiment, the process comprises after step g), the step:

h) recycling trichlorosilane as feed material toward the reaction column via a tetrachlorosilane/trichlorosilane separation column.

According to another embodiment, the reaction column comprises a mixing tray section between the upper feed injection point and the lower catalyst injection point, preventing liquid catalyst freezing by direct contact with cold reflux liquid. In addition to that, this mixing tray section located over the reaction tray section facilitates vapour-liquid material and heat transfer toward their equilibrium at the top of the reaction column by mixing the reflux liquid and the gaseous mixture formed by disproportionation reactions from the reaction tray section containing monosilane, monochlorosilane, dichlorosilane, and trichlorosilane.

Said catalyst maybe a catalytically active solid matter including, for example, solid substances in which amino groups or alkylene amino groups are carried on a frame of polystyrol cross-linked by divinylbenzol. Amino groups of alkylene amino groups include, for example: dimethylamino, diethylamino, ethylmethylamino, di-n-propylamino, di-isopropylamino, di-2-chloroethylamino, di-2-chloropropylamino groups and their hydrochlorides or the trialkylammonium groups which are produced therefrom by means of methylation, ethylation, propylation, butylation, hydroxyethylation or benzylation and contain chloride as counterion. Of course, catalytically active solid matter containing other anions, e.g. hydroxide, sulphate, hydrogen sulphate, bicarbonate and others, can be introduced into the process according to the invention in the case of quaternary ammonium salts or protonated ammonium salts. However, conversion into the chloride form will inevitably occur as time passes due to the reaction conditions, even in the case of organic hydroxy groups. Therefore ammonium salts containing chloride as counterion are preferred.

Suitable catalytically active solid matter also includes, for example, solid substances consisting of a frame of polyacrylic acid, especially a frame of polyacrylamide, which has bound trialkylbenzylammonium, e.g. via an alkyl group.

Another group of catalytically active solid matter suitable for the process according to the invention includes, for example, solid substances in which sulphonate groups are bound to a frame of polystyrol cross-linked by divinylbenzol, the cationic companions of the sulphonate groups being tertiary or quaternary ammonium groups.

More preferably, the catalyst to be used is at least one of a tertiary aliphatic hydrocarbon-substituted amine and a tertiary aliphatic hydrocarbon-substituted amine hydrochloride. Compounds represented by formulae $R_1R_2R_3N$ (A) and $R_1R_2R_3NH^+Cl^-$ (B) are suitably used for the tertiary aliphatic hydrocarbon-substituted amine and the tertiary aliphatic hydrocarbon-substituted amine hydrochloride, respectively.

In the formulae (A) and (B), each of $R_1$, $R_2$ and $R_3$ is an aliphatic hydrocarbon group, the carbon number of each of $R_1$, $R_2$ and $R_3$ is at least 2, and $R_1$, $R_2$ and $R_3$ may be the same or different.

Such kind of liquid amine catalysts have already been investigated and effective operational parameters were summarized in JP-B-64-3804 and JP-B-63-33422. The tertiary aliphatic hydrocarbon-substituted amine may be, for example, tri-n-octylamine, tri-n-butylamine, and so on. In the above formulae (A) and (B), the carbon number of each of the aliphatic hydrocarbon groups is preferably at least 2 and more preferably from 6 to 15. In the present invention, the above-mentioned catalyst is applied and brought into contact with trichlorosilane/dichlorosilane/monochlorosilane, thereby forming dichlorosilane, monochlorosilane and monosilane in accordance with the following disproportionation formulae (1), (2) and (3):

$$2SiHCl_3 \Leftrightarrow SiCl_4 + SiH_2Cl_2 \quad (1)$$

$$2SiH_2Cl_2 \Leftrightarrow SiHCl_3 + SiH_3Cl \quad (2)$$

$$2SiH_3Cl \Leftrightarrow SiH_2Cl_2 + SiH_4 \quad (3)$$

Among others, it is preferable to use from 98 to 50 mole %, particularly preferably from 98 to 60 mole % tertiary aliphatic hydrocarbon-substituted amine and from 2 to 50 mole %, particularly preferably from 2 to 40 mole % tertiary aliphatic hydrocarbon-substituted amine hydrochloride.

If the rate of the latter is less than 2 mole %, the catalytic activity is low; if the rate exceeds 40 mole %, hydrochloric acid is released during the reactions, whereby reactions below proceed and monosilane is not efficiently produced.

$$SiH_4 + HCl \rightarrow SiH_3Cl + H_2 \quad (4)$$

$$SiH_3Cl + HCl \rightarrow SiH_2Cl_2 + H_2 \quad (5)$$

$$SiH_2Cl_2 + HC \rightarrow SiHCl_3 + H_2 \quad (6)$$

$$SiHCl_3 + HCl \rightarrow SiCl_4 + H_2 \quad (7)$$

The reaction column is one of a distillation column type, and the reaction column suitably used may be a plate column partitioned by sieve trays, bubble cap trays or the like, or a packed column filled with a packing material such as Raschig ring or pall ring. Since the production of monosilane is a liquid phase reaction through the disproportionation reactions, the reaction column is preferably one having a large liquid hold-up capacity.

The reaction temperature is not constant, either because of a temperature distribution in the reaction column, but the reactions are conducted, for example, in a range of from 10° C. to 150° C., preferably from 30° C. to 120° C. If the reaction temperature is lower than 10° C., the reaction temperature could be too low for the disproportionation reactions to substantially proceed. On the other hand, if the temperature exceeds 150° C., thermal decomposition of the catalyst is likely to take place, which is undesirable. Since the reactions are preferably conducted in a boiling state, the gauge pressure is preferably at a level of from 100 kPaG to 1000 kPaG, more preferably from 100 kPaG to 500 kPaG in order to keep the reaction temperature in the above-mentioned range.

The temperature of the bottom portion is controlled by a bottom reboiler, and tetrachlorosilane which need not be returned to the reaction column is preferably selectively recovered from the bottom portion. Therefore, the temperature of the bottom reboiler is preferably from 100° C. to 150° C., more preferably from 90° C. to 120° C.

The mixture formed by the reactions in the top of the reaction column contains chlorosilanes of monochlorosilane, dichlorosilane and trichlorosilane, and monosilane.

According to the present invention, monosilane which is industrially significantly useful is continuously produced readily and efficiently. Moreover, in the silane production process of the present invention, in order to manufacture one mole of monosilane, only two moles of DCS feed are enough. Besides, only one mole of STC is manufactured as a by-product. One advantage is the reduction of the feed flow rate and byproduct silicon tetrachloride flow rate at the same time. Another advantage is the reduction of logistics for feed and by-products materials. Another advantage of the invention is to minimize reactive distillation duty, resulting less utility consumption and smaller equipment.

BRIEF DESCRIPTION OF THE DRAWINGS

FIG. 1 is a schematic diagram showing an example of an apparatus to be used in the process of the present invention.

DESCRIPTION OF PREFERRED EMBODIMENTS

Dichlorosilane is supplied through a raw material feed pipe 4 to an upper stage 2 (a region from about 70% of the height of the reaction column to the top), via an upper injection point 9, of a reaction column 1. The reaction column 1 is a distillation column comprising several trays and each tray is a sieve tray. Above the reaction column 1 (in a region above the upper tray), there are at least 2 upper condensers 3, 5 each of which has a reflux feed pipe 6 and 7 serially connected to a top portion 2 of the reaction column which can be cooled for example by supplying cooling water. In the lower portion of the reaction column 1, there is provided a bottom reboiler 8.

The catalyst for the disproportionation reactions is introduced through a feed pipe 11 to the upper stage 2, via a lower injection point 10, of the reaction column 1.

The reaction column 1 may comprise a mixing tray section 12 between the upper feed injection point 9 and the lower liquid catalyst injection point 10, preventing liquid catalyst freezing by direct contact with cold reflux liquid.

The disproportionation reactions and the separation by distillation proceed simultaneously in the reaction column 1 and a gas rich in low-boiling-point components such as monosilane produced in the disproportionation reactions moves upward. The resultant mixture discharged from the top portion 2 of the reaction column 1, comprising monosilane, monochlorosilane, dichlorosilane, and trichlorosilane is supplied to the upper condensers 3, 5 to be cooled. Here, the chlorosilanes enriched monosilane are separated from chlorosilanes condensates sent to the top portion of the column 1 via the reflux feed pipes 6 and 7. The aforementioned mixing tray section 12 occasionally installed over the reaction tray section facilitates vapour-liquid material and heat transfer toward their equilibrium at the top of the reaction column by mixing the reflux liquid and the gaseous mixture formed by disproportionation reactions from the reaction tray section.

Monosilane is efficiently obtained by separating monosilane from the resultant mixture and recycling a remaining condensate to the reaction column. Furthermore, this condensate mixture composed of monochlorosilane, dichlorosilane and trichlorosilane separated and recovered is preferably recycled to the upper stage of the reaction column so as to be brought into contact with the catalyst, because the conversion rate is improved. If the condensates are recycled to the middle stage of the reaction column (a region of about one third to two thirds of the reaction column in height from the bottom), the disproportionation reactions do not proceed sufficiently and the yield of monosilane is not improved.

The mixture formed by the reactions contains chlorosilanes of monochlorosilane, dichlorosilane and trichlorosilane, and monosilane. In the present invention, monosilane is separated and taken out from the mixture and the chlorosilanes are recycled to the reaction column. The separation of monosilane from the mixture is conducted through condensation of the mixture by a condenser, and the condensation is carried out in a range of a condensate temperature of from 50 to −100 degrees centigrade. According to the present invention, this condensation is carried out in multiple separate stages.

If the condensate temperature in the condenser exceeds 50 degrees centigrade, separation of monosilane from the chlorosilanes such as dichlorosilane and monochlorosilane is inadequate and an amount of the condensate recycled to the reaction column is small, so as to result in decrease in reaction rate. On the other hand, if the temperature is lower than −100 degrees centigrade, there is a risk of solidification of hydrochlorosilanes.

According to the present invention, the condensates at the temperature of from 50 to −100 degrees centigrade are refluxed to the reaction column by means of upper condensers each of which has a reflux feed pipe serially connected to a top portion of the reaction column. The number of upper condensers with the reflux feed pipe is at least 2. A temperature difference between the condensates of upper condensers adjacent to each other is appropriately determined in accordance with the number of upper condensers with the reflux feed pipe.

High-boiling-point components such as tetrachlorosilane move to the bottom portion 13 of the reaction column (a region lower than the lowest tray) and are withdrawn together with the catalyst from the bottom reboiler 8 to an evaporation tank 14 while the liquid level thereof is controlled. A heating medium is circulated in a jacket to heat the evaporation tank 14. The evaporation tank 14 is operated at a temperature which is higher than the boiling point of tetrachlorosilane formed by the disproportionation reactions and lower than the boiling point of the catalyst; tetrachlorosilane and trichlorosilane are evaporated, collected in a lower condenser 15 cooled with cooling water for example, and recovered into a buffer tank 16. The catalyst remaining in the evaporation tank 14 is withdrawn by a pump 17 and recycled to the upper stage of the reaction column 1. In this case, if the concentration of the tertiary aliphatic hydrocarbon-substituted amine hydrochloride in the catalyst is less than a predetermined concentration, hydrogen chloride is supplied through a supply pipe 18 as occasion may demand.

The mixture of tetrachlorosilane and trichlorosilane contained in the buffer tank 16 is sent to a separation column 19 via the pipe 20. The tetrachlorosilane moves to the bottom portion 23 of the column 19 and is extracted and recovered into a collecting tank 21. The trichlorosilane moves to the top portion 22 of the column 19 and is recycled as feed material via the pipe 4 via a water cooler 24 and a trichlorosilane buffer 25 connected to the pipe 4 via the pipe 26.

Now, the present invention will be explained with reference to examples. The experiment was carried out using the apparatus of the flow shown in FIG. 1. Table 1 relates the utility consumption of the different elements of the apparatus implementing the process according to the invention in function of the localization of the injection of 100% DCS.

TABLE 1

| Utility | Duty | Upper stage feed | Upper stage feed | Upper stage feed | Upper stage feed | Upper stage feed | Upper stage feed | Middle stage feed | Middle stage feed | Middle stage feed |
|---|---|---|---|---|---|---|---|---|---|---|
| Injection stage | % of total height of column 1 | 95% | 90% | 85% | 80% | 75% | 70% | 65% | 60% | 55% |
| Reboiler 8 | kWth | 104.2 | 104.1 | 104.6 | 105.8 | 107.7 | 110.4 | 113.9 | 118.4 | 124.2 |
| Condenser 3 | kWth | 75.0 | 74.4 | 74.8 | 76.0 | 78.0 | 80.7 | 84.3 | 88.8 | 94.6 |
| Condenser 5 | kWth | 6.5 | 7.2 | 7.2 | 7.2 | 7.2 | 7.1 | 7.1 | 7.0 | 6.9 |
| Total consumption | kWth | 185.7 | 185.7 | 186.6 | 189 | 192.9 | 198.2 | 205.3 | 214.2 | 225.7 |

These results show that according to the process of the invention, it is possible to minimize the consumption of the process (reboil/condense load of the reaction column) of almost 20% compared to the process of the prior art wherein the injection point of chlorosilanes is in the middle stage of the reaction column.

The benefits of the present invention compared to the method of the prior art are:

Reduction of feed flow rate and byproduct silicon tetrachloride flow rate at the same time, reducing logistics and byproduct materials.

Reduction of reactive distillation heat load.

Reduction of column vapour load resulting in a reduction of the reaction column diameter.

Reduction of column liquid load, catalyst and HCL injections are also reduced.

Reduction of the recycling TCS flow rate (for example, compare to the examples shown in the prior arts (JP2, 648,615 and EP 2085358)).

The invention claimed is:

1. A process for continuously producing monosilane in a monosilane production apparatus comprising a reaction column (1), at least two upper condensers (3, 5) each of which has a reflux feed pipe (6, 7) serially connected to a top portion of the reaction column (1), a bottom reboiler (8) of the reaction column (1), and an evaporation tank (14) connected to a bottom portion (13) of the reaction column (1); the process comprising:

a) supplying dichlorosilane or a mixture of tetrachlorosilane, trichlorosilane, dichlorosilane, and monochlorosilane, wherein the ratio of the number of total hydrogen atoms to the number of total chlorine atoms (H/Cl) is in the range from 0.6 to 3, to a region (2) higher than 70% of the column (1) in height via an upper feed injection point (9);

b) supplying a catalyst to said upper stage (2) of the reaction column (1) via a lower injection point (10);

c) introducing a resultant mixture containing monosilane, monochlorosilane, dichlorosilane, and trichlorosilane from the top portion of the reaction column (1) to the plurality of upper condensers (3, 5);

d) separating monosilane from condensates containing monochlorosilane, dichlorosilane, and trichlorosilane in the upper condensers (3, 5);

e) recycling the condensates after separating monosilane, through the reflux feed pipes (6, 7) to the upper stage (2) of the reaction column (1);

f) bringing the condensates into contact with the catalyst in the reaction column;

characterized in that wherein a monosilane rich gas, having monosilane as the largest component on a molar basis relative to monochlorosilane, dichlorosilane, and trichlorosilane, is produced via a pipe (27) connected downstream of the upper condensers; and wherein said catalyst is at least one of a tertiary aliphatic hydrocarbon-substituted amine and a tertiary aliphatic hydrocarbon-substituted amine hydrochloride; and wherein said monosilane rich gas, produced via a pipe (27) connected downstream of the upper condensers, comprises more than 60% of monosilane.

2. The process of claim 1, wherein the tertiary aliphatic hydrocarbon-substituted amine and the tertiary aliphatic hydrocarbon-substituted amine hydrochloride are represented by the following formulae (A) and (B), respectively: $R_1R_2R_3N$ (A); $R_1R_2R_3NH^+Cl^-$ (B), where each of $R_1$, $R_2$ and $R_3$ is an aliphatic hydrocarbon group, the carbon number of each of $R_1$, $R_2$ and $R_3$ is at least 2, and $R_1$, $R_2$ and $R_3$ are the same or different.

3. The process of claim 1, further comprising the step:

g) withdrawing a bottom recovery liquid containing tetrachlorosilane, tricholorosilane and the catalyst from the bottom portion (13) of the reaction column (1), introducing the bottom recovery liquid into the evaporation tank (14), and recycling the catalyst recovered from the bottom portion of the evaporation tank, to the reaction column.

4. The process of claim 1, wherein the number of the upper condensers is from 2 to 5.

5. The process of claim 3, further comprising, after step g), the step of:

h) recycling trichlorosilane as feed material toward the reaction column (1) via a tetrachlorosilane/trichlorosilane separation column (19).

6. The process of claim 1, wherein only dichlorosilane is supplied in step a).

7. The process of claim 1, wherein the monosilane rich gas comprises more than 80% of monosilane.

* * * * *